United States Patent
Hofmann et al.

(10) Patent No.: US 6,832,855 B2
(45) Date of Patent: Dec. 21, 2004

(54) WHEEL BEARING UNIT WITH MOUNTING OPENINGS FOR THE BRAKE CALIPER CARRIER

(75) Inventors: Heinrich Hofmann, Schweinfurt (DE); Jens Heim, Schweinfurt (DE); Peter Niebling, Bad Kissingen (DE); Werner Schlereth, Schweinfurt (DE); Wolfgang Seidl, Schweinfurt (DE)

(73) Assignee: FAG Kugelfischer AG (DE)

( * ) Notice: Subject to any disclaimer, the term of this patent is extended or adjusted under 35 U.S.C. 154(b) by 53 days.

(21) Appl. No.: 10/350,528

(22) Filed: Jan. 22, 2003

(65) Prior Publication Data

US 2003/0165280 A1 Sep. 4, 2003

(30) Foreign Application Priority Data

Jan. 22, 2002 (DE) .......................... 102 02 200

(51) Int. Cl.$^7$ .......................... F16D 65/00; B60B 27/00
(52) U.S. Cl. ...................... 384/544; 188/73.1
(58) Field of Search ............... 384/544, 589; 188/73.1; 301/105.1, 6.8; 280/124.154, 124.146, 124.147, 124.148

(56) References Cited

U.S. PATENT DOCUMENTS

| 3,749,416 | A | * | 7/1973 | Asberg ........................ 384/544 |
| 4,582,338 | A | * | 4/1986 | Colanzi ............... 280/124.146 |
| 5,927,820 | A | * | 7/1999 | Vignotto et al. ......... 301/105.1 |

* cited by examiner

Primary Examiner—Thomas R. Hannon
(74) Attorney, Agent, or Firm—Ostrolenk, Faber, Gerb & Soffen, LLP

(57) ABSTRACT

A wheel bearing unit having a bearing including an outer race attachable to a wheel carrier and a rotating inner race attachable to a wheel hub. The outer race includes a first plurality of mounting openings for mounting a brake caliper assembly, and second plurality of mounting openings for mounting the outer race on the wheel carrier. The first and second pluralities of mounting openings are symmetrically arranged enabling the wheel bearing unit to be used on the left and right sides of the vehicle with the caliper assemblies in the same relative positions on both sides. The first mounting openings lie at a substantially larger radial distance from the axis of rotation of the bearing than the second mounting openings, whereby the second openings overlie a region of higher strength in the wheel carrier, and the first openings are clear of the region of higher strength.

5 Claims, 8 Drawing Sheets

WHEEL BEARING UNIT WITH MOUNTING OPENINGS FOR THE BRAKE CALIPER CARRIER

FIELD OF THE INVENTION

The invention relates to connections of a wheel bearing unit to the brake caliper carrier and to the wheel carrier for a wheel of a motor vehicle.

BACKGROUND OF THE INVENTION

Many publications concern the integration of parts in the area surrounding a wheel bearing. Thus, mounting openings for the brake caliper carrier, which are arranged on the stationary part of the wheel bearing unit, are shown in DE 84 01 811 U. This arrangement has a problem in that different wheel bearing units have to be produced for the left-hand and right-hand sides of the vehicle to enable attachment of the brake caliper carrier in an identical position. Although a wheel bearing unit which can be used on both sides of the vehicle is shown in FIG. 2 of this publication, an additional part is required in this Figure for mounting the brake caliper.

A wheel bearing unit having mounting openings for accommodating a brake caliper carrier on the stationary flange of the wheel bearing unit is shown in DE 101 05 298. The problem with this arrangement in FIG. 7b is that the radial distances shown there between the mounting openings for the wheel carrier and the mounting openings for the brake caliper carrier are too small in order to be able to firmly screw the brake caliper in place, without causing strength problems in the wheel carrier. Recesses have to be made in the wheel carrier around the mounting openings of the brake caliper carrier. These recesses affect the strength of the wheel carrier. If the distance as shown in FIG. 7b is too small, strength problems occur in the wheel carrier. In the case of driven wheels additionally, further free space for the constant velocity joint is to be provided inside the wheel carrier.

The same problems also apply to the arrangement in DE-A 21 05 123 wherein the mounting openings for the brake caliper carrier are arranged on the same pitch circle as the mounting openings for the wheel carrier.

OBJECT OF THE INVENTION

The object of the invention is to provide a wheel bearing unit which has mounting openings for accommodating a brake caliper or brake caliper carrier and which can be used on both sides of a vehicle, while also providing a favorable stress distribution due to adequate strength in the material of the adjacent portion of the wheel carrier or spindle.

DESCRIPTION OF THE INVENTION

This object is achieved by the invention. The invention comprises mounting openings arranged symmetrically in the stationary ring of the wheel bearing unit. If all the openings lie symmetrically relative to at least one axis of symmetry, the wheel bearing unit can be used on both the left-hand and the right-hand vehicle side. Positioning the mounting openings for the brake caliper assembly on a larger pitch circle enables the wheel carrier to be designed with a continuous annular region for accommodating the wheel bearing unit and enables recesses for mounting the brake caliper carrier to lie outside this annular region. This is especially important for driven wheels, since the constant velocity joint in the case of these wheels is arranged inside the wheel bearing unit, and this region therefore has to be recessed inside the wheel carrier.

Providing the mounting openings to lie in one plane has production advantages.

The ends of the mounting opening for accommodating the brake caliper assembly and for mounting the bearing may be coplanar, or the brake caliper mounting openings may be axially offset outwardly (i.e., away from the spindle) by locating the mounting openings for the brake caliper assembly in an angled projection. The advantage of the mounting opening being axially offset is that the recesses in the wheel carrier can be dispensed with, since the brake caliper carrier lies between the wheel carrier and the angled projection.

Other features and advantages of the present invention will become apparent from the following description of the invention which refers to the accompanying drawings.

DESCRIPTION OF THE PRIOR ART

Figure 1A:
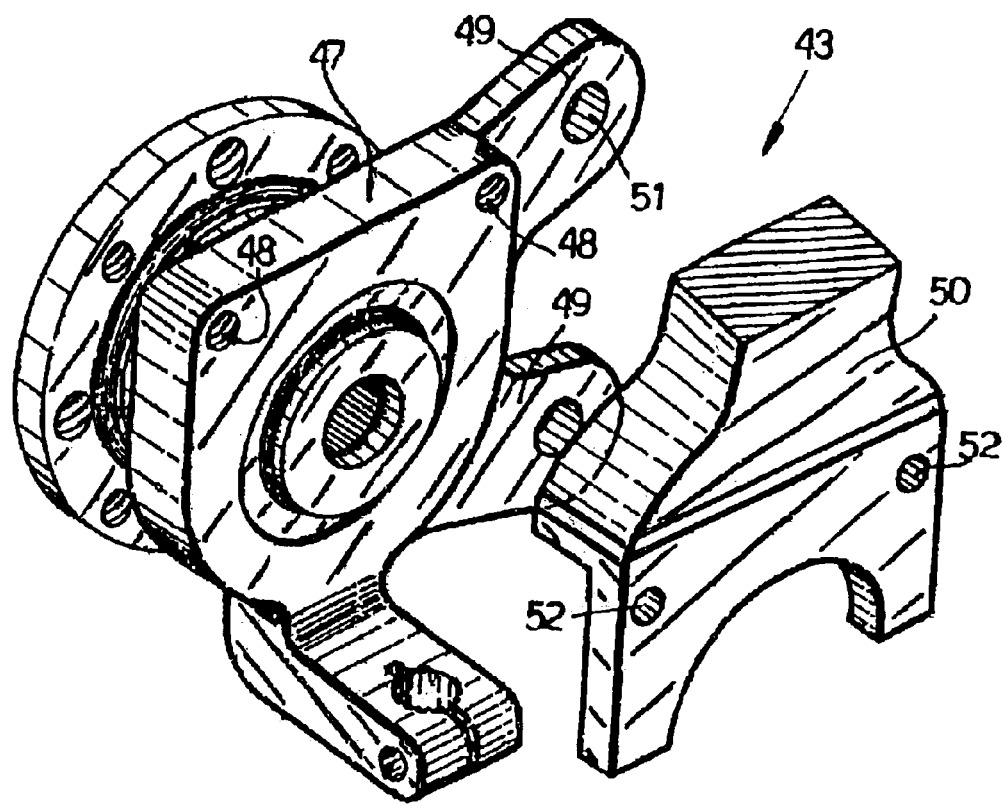
FIGS. 1a and b show prior art wheel carriers according to DE 84 01 811 U and DE 101 05 298, respectively.
Figure 3:
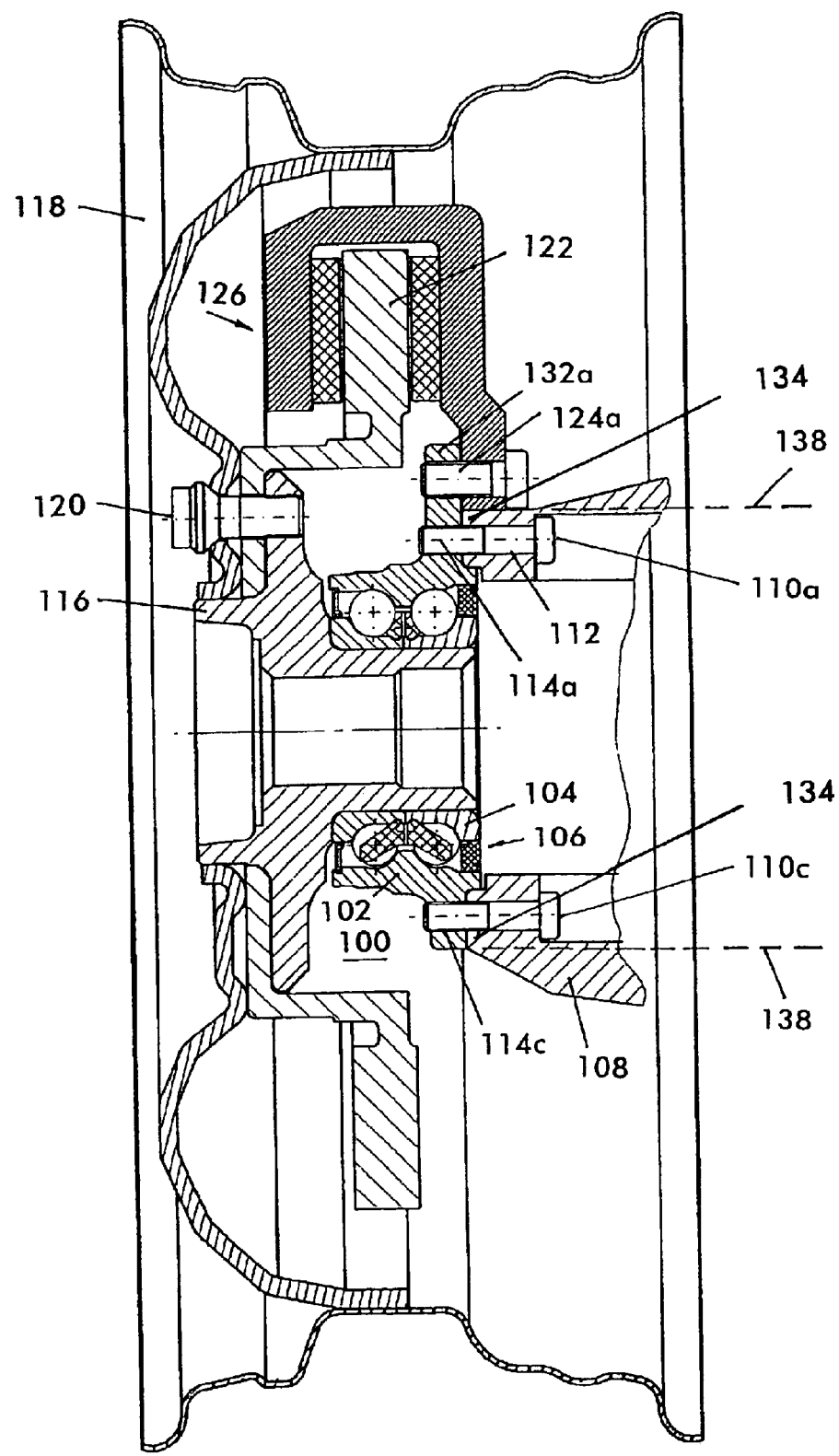
FIG. 3 shows a sectional view of a wheel assembly incorporating the present invention.

FIG. 1a corresponds to FIG. 3 of DE 84 01 811 U. It is shows a wheel bearing unit 43 with mounting openings 48 for attaching the stationary ring 47 of the bearing unit to a wheel carrier 50 through aligned holes 52, and mounting openings 51 for the brake caliper assembly on projections 49 extending from stationary ring 47. The asymmetry of this wheel bearing unit can be seen from the arrangement of the mounting holes 48 relative to the mounting projections 49. For this reason, if the brake calipers are to be located in the same relative position on both sides of the vehicle, this unit can only be used on one side.

Figure 1B:
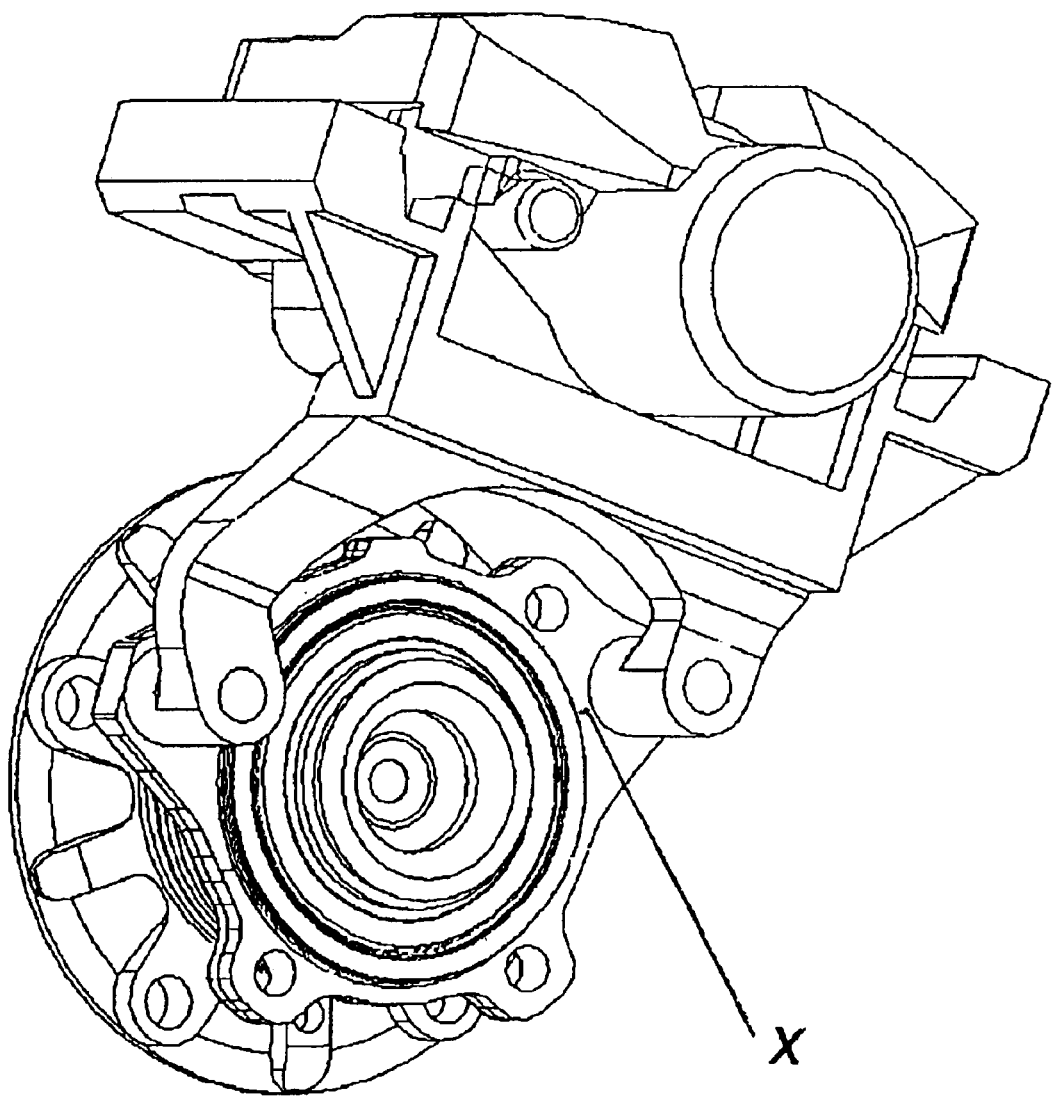

FIG. 1b corresponds to FIG. 7b of DE 101 05 298. The region identified by "X" which overlies the portion of the wheel carrier (not shown) which supports the bearing unit is too small radially to provide adequate strength in the wheel carrier.

Figure 2:
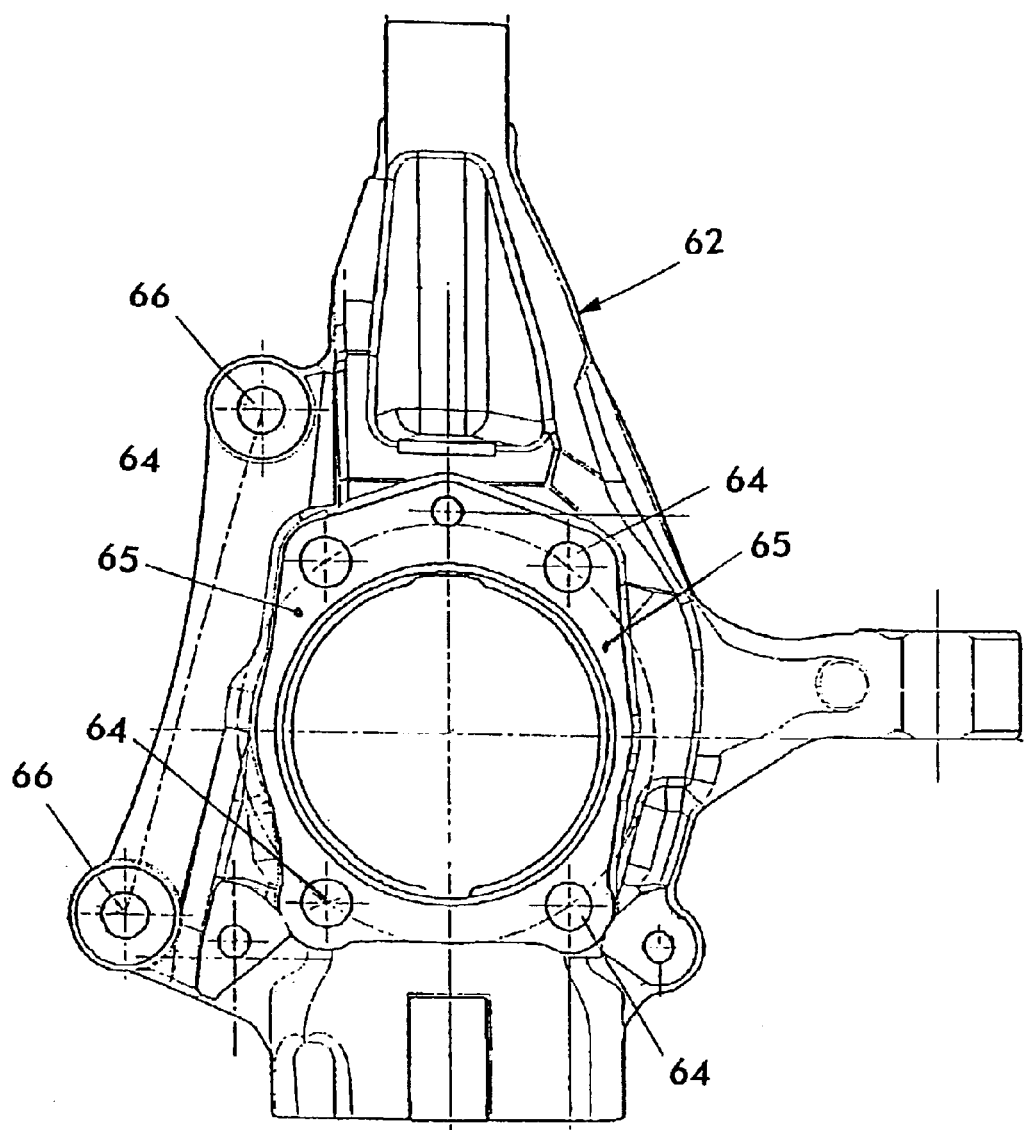
FIG. 2 shows another prior art wheel carrier.

Another prior art wheel carrier 62 is shown in FIG. 2. The four mounting holes 64 for accommodating the wheel bearing unit are placed in a region of higher strength 65 of the wheel carrier 62. The brake caliper assembly is mounted in the openings 66. The mounting of the brake caliper to the wheel carrier is conventional in the prior art.

DETAILED DESCRIPTION OF PREFERRED EMBODIMENTS

Referring to FIG. 3, a wheel assembly incorporating the present invention is comprised of a wheel bearing unit 100 including a stationary ring 102 forming the outer bearing race, and a rotating part 104 forming the inner bearing race, and rotatable with respect to the stationary ring 102 on a suitable bearing 106. Wheel bearing unit 100 is mounted on a spindle or wheel carrier 108 by means of bolts 110 extending through bores 112 in spindle 108 and aligned threaded openings 114 in stationary bearing ring 102. In the illustrated embodiment, four bolts 110a–110d are employed, as shown in FIG. 3a, with bolts 110a and 110c illustrated in FIG. 3.

Still referring to FIG. 3, bearing unit 100 is press-fitted onto a hub or wheel flange 116 in a conventional manner. A wheel or rim 118 is attached to hub 116 by wheel nuts, one of which is shown at 120. Wheel nuts 120 also serve to mount the brake disk or rotor 122 on hub 116.

Figure 3A:
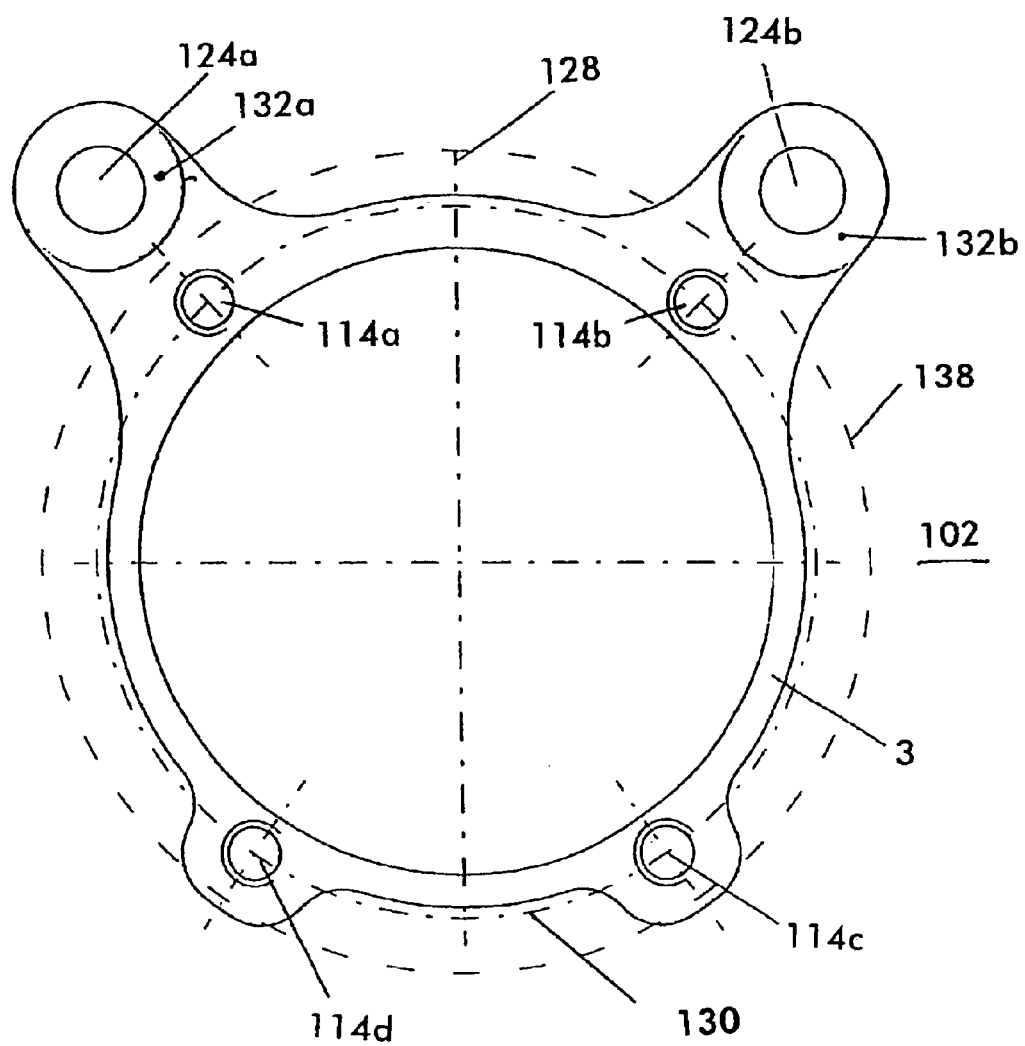
FIGS. 3a, 3b, 3c respectively show preferred variants of the stationary ring of the wheel bearing unit according to the invention.

As illustrated in FIGS. 3 and 3a, stationary bearing ring 102 includes, in addition to threaded mounting openings 114a–114d by which ring 102 is attached to wheel carrier 108, as previously described, a plurality of second threaded mounting openings 124 for mounting a brake caliper assembly 126. In this embodiment, there are two mounting openings 124a and 124b for brake caliper assembly 126. Mounting openings 114 and 124 are arranged symmetrically in ring 102 about a line of symmetry 128. Ring 102 (and correspondingly, bearing assembly 100), can therefore be used to mount brake caliper assembly 126 in the same relative position on either the left or right side of the vehicle.

In the embodiments of FIGS. 3 and 3a–3c, the respective ends of mounting openings 114 and 124 are axially coplanar. Mounting openings 114a–114d are located on an inner pitch circle 130 (FIG. 3a), while openings 124a and 124b are located radially outwardly. The regions 132a and 132b around respective mounting openings 124a and 124b are offset to clear the adjacent portions 134 (FIG. 3) of wheel carrier 108 so that brake caliper assembly 126 can be firmly screwed to stationary ring 102.

In the embodiment of FIG. 3a, mounting openings 114a and 114c are diametrically aligned with mounting opening 124a, and mounting openings 114b and 114d are diametrically aligned with mounting opening 124b. Regions 132a and 132b lie radially outside the outer envelope circle 136 (FIG. 3b) of the mounting openings 114. The portion of wheel carrier 108 which supports bearing unit 100 can therefore be made sufficiently thick (in the axial direction) to exhibit the necessary strength without disturbing recesses. The outside diameter of the region of higher strength in the wheel carrier 108 is shown by a broken line 138 in FIGS. 3 and 3a.

Figure 3B:
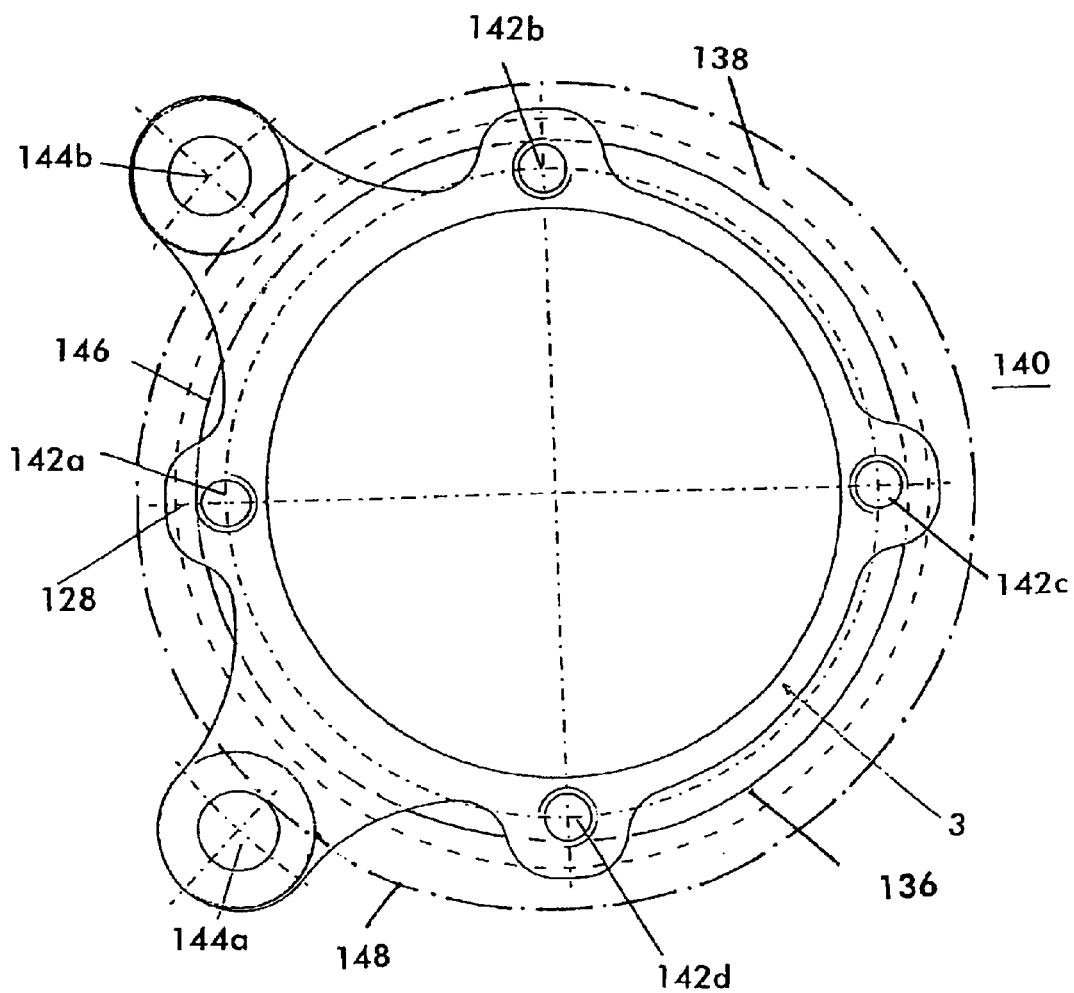

A second embodiment of the stationary ring according to this invention is shown at 140 in FIG. 3b. This is similar to the embodiment shown in FIG. 3a, except that openings 142a–142d for mounting the bearing unit on wheel carrier 108 are offset by 45° relative to brake caliper assembly mounting openings 144a and 144b. Here, to achieve a sufficiently large region of higher strength on wheel carrier 108, the outer envelope circle 146 of mounting openings 142a–142d lies radially inside the inner envelope circle 148 of mounting openings 144a and 144b. Again, the outside diameter of the region of higher strength in the wheel carrier 108 is shown by a broken line 138.

Figure 3C:
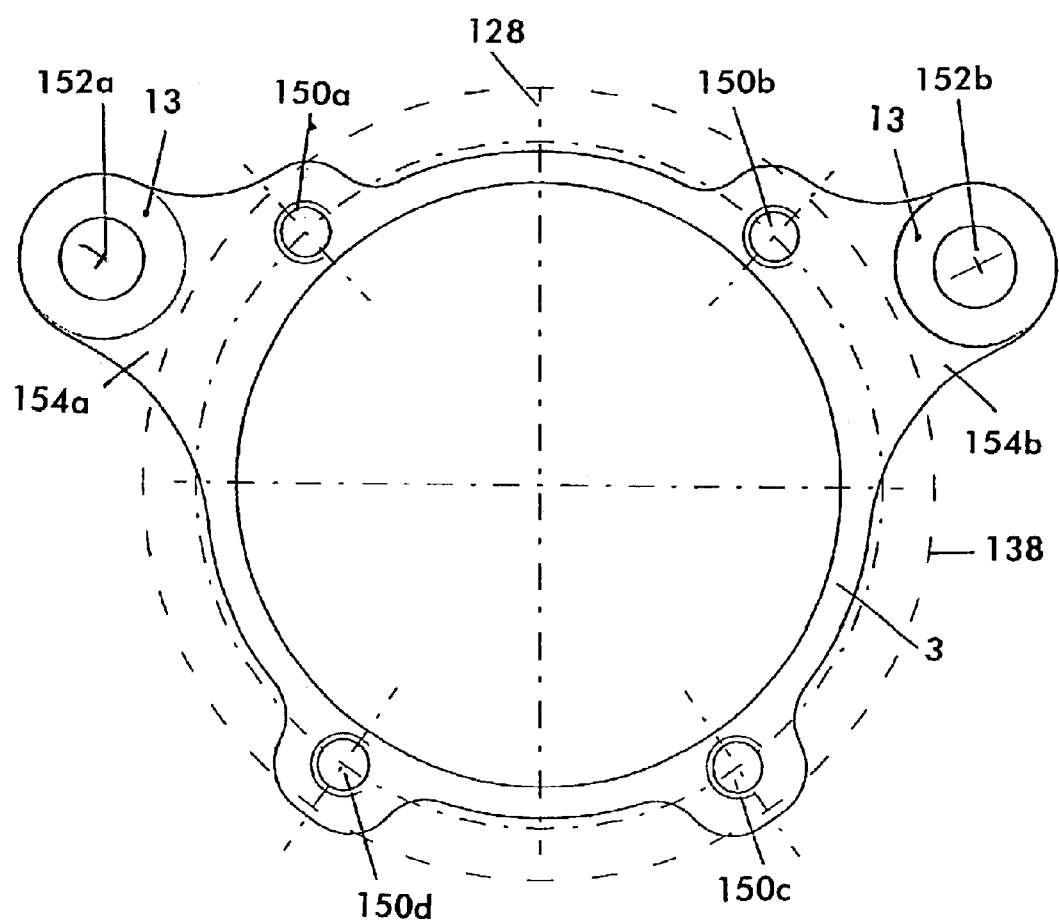

In the embodiment of FIG. 3c, bearing mounting openings 150a–150d are also offset relative to caliper assembly mounting openings 152a and 152b, but by a smaller angle than in the case of FIG. 3b and in opposite directions. Here, the radially extending flanges 154a and 154b which carry mounting openings 152a and 152b are enlarged circumferentially compared to those in FIG. 3a to accommodate the necessary region of higher strength in wheel carrier 108, as again indicated by broken line 138, while providing adequate clearance for the brake caliper assembly mounting bolts.

Figure 4:
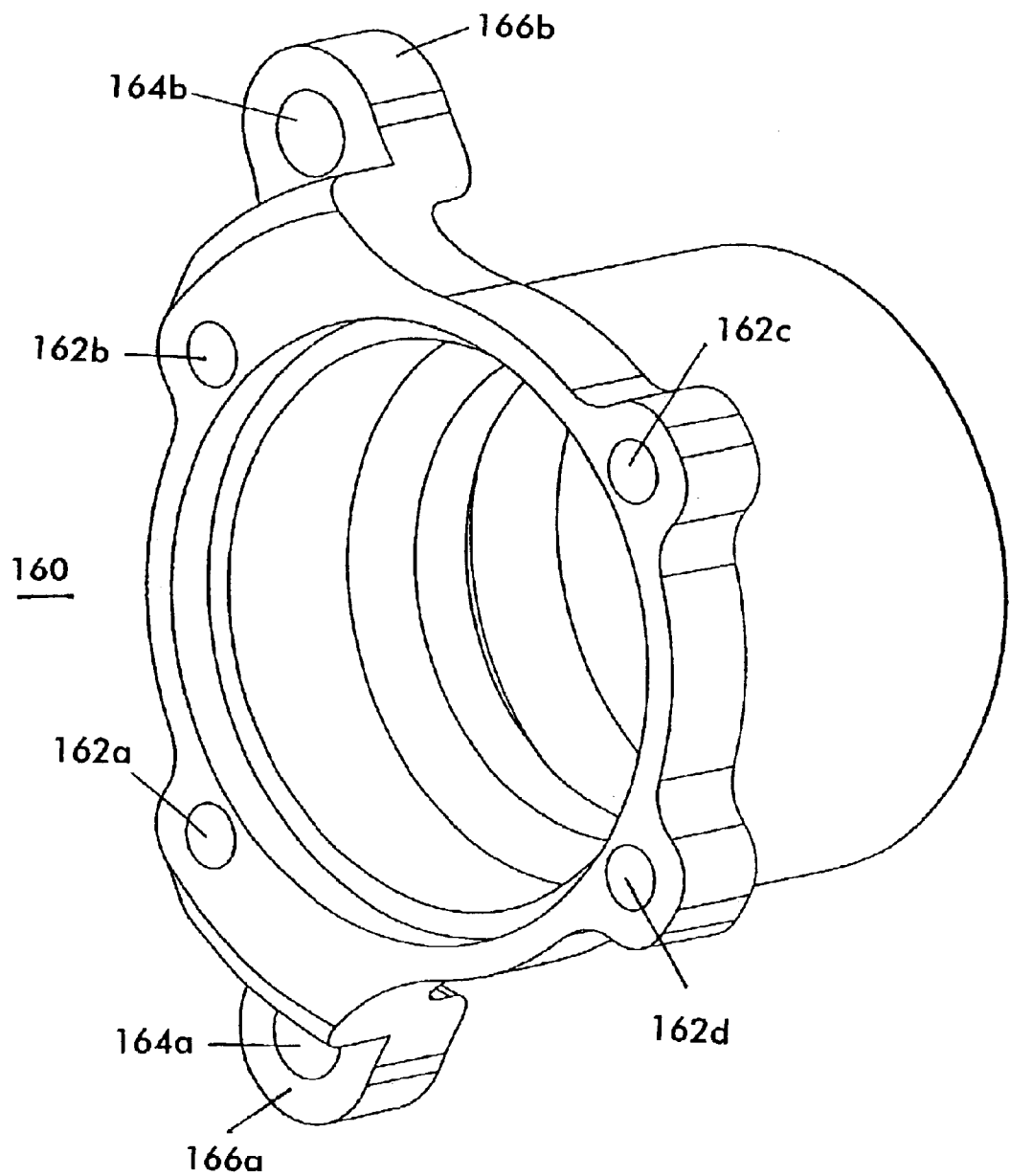
FIG. 4 shows a variant of the stationary flange according to the invention with an angled projection for mounting the brake caliper.

A fourth embodiment of the stationary ring according to the invention is shown at 160 in FIG. 4. Again, the bearing mounting openings 162a–162d and brake caliper assembly mounting openings 164a and 164b are symmetrically positioned, so the same bearing unit can be used on both sides of a vehicle. This embodiment differs from those of FIGS. 3 and 3a–3c in that the flanges 166a and 166b which carry brake caliper assembly mounting openings 164a and 164b are axially offset outwardly, i.e., toward the side of the vehicle so that the ends of mounting openings 164a and 164b are no longer coplanar with the ends of bearing mounting openings 162a–162d. Due to this configuration, the brake caliper assembly can be located between the wheel carrier and caliper mounting openings 164a and 164b. A recesses in the brake caliper assembly is not necessary in this design.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing unit comprising:
   a bearing including an outer bearing race and an inner bearing race rotatable with respect to the outer race;
   a first flange connected to the inner bearing race that is configured for attachment thereto of a brake disk and a wheel;
   a plurality of first mounting openings in the outer bearing race that are configured to permit attachment of a brake caliper assembly to the outer race; and
   a plurality of second mounting openings in the outer bearing race that are configured to permit attachment of the outer race to a wheel carrier, wherein:
   the first and second mounting openings are arranged relative to an axis of symmetry extending across the outer bearing race such that the wheel bearing assembly is mountable on the left and right sides of a vehicle with a brake caliper assemblies in the same relative position on both sides,
   the second mounting openings are located at a first radial distance relative to the rotational axis of the bearing such that the second mounting openings overlie a region of high strength on the wheel carrier; and
   the first mounting openings are located at a second radial distance relative to the rotational axis of the bearing which is sufficiently greater that the first radial distance that the first mounting openings are clear of the region of high strength on the wheel carrier.

2. The wheel bearing unit of claim 1, wherein the respective ends of the first and second mounting openings are coplanar.

3. The wheel bearing unit of claim 1, wherein:
   the respective ends of the second mounting openings are coplanar; and
   the respective ends of the first mounting openings are coplanar, and axially offset from the ends of the second mounting openings.

4. The wheel bearing unit of claim 1, wherein there is an inner envelope circle of the first mounting openings and an outer envelope circle of the second mounting openings and the outer envelope circle lies radially inside the inner envelope circle.

5. The wheel bearing assembly of claim 1, wherein the second mounting openings are angularly positioned such that each of the second openings is diametrically aligned with one of the plurality of first mounting openings.

* * * * *